(12) United States Patent
Liu et al.

(10) Patent No.: US 11,489,771 B2
(45) Date of Patent: *Nov. 1, 2022

(54) EFFICIENT FORWARDING INFORMATION BASE CACHING SYSTEM AND METHOD

(71) Applicants: Yaoqing Liu, Potsdam, NY (US); Lan Wang, Germantown, TN (US)

(72) Inventors: Yaoqing Liu, Potsdam, NY (US); Lan Wang, Germantown, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/149,680

(22) Filed: Oct. 2, 2018

(65) Prior Publication Data

US 2019/0173788 A1    Jun. 6, 2019

Related U.S. Application Data

(63) Continuation of application No. 14/524,890, filed on Oct. 27, 2014, now Pat. No. 10,091,105.

(60) Provisional application No. 61/895,486, filed on Oct. 25, 2013.

(51) Int. Cl.
*H04L 45/74* (2022.01)

(52) U.S. Cl.
CPC .................. *H04L 45/742* (2013.01)

(58) Field of Classification Search
CPC .............. H04L 45/748; H04L 61/2007; H04L 45/7457; H04L 45/00; H04L 45/742; H04L 45/04; H04L 61/6009; H04L 45/64; H04L 67/02; H04L 67/16; H04L 45/306; H04L 45/02; H04L 45/745; H04L 49/356; H04L 49/3009; H04L 29/12811; H04L 45/08; H04L 45/74
See application file for complete search history.

(56) References Cited

U.S. PATENT DOCUMENTS

| | | | | |
|---|---|---|---|---|
| 7,940,763 B1* | 5/2011 | Kastenholz | ......... | H04L 12/2856 370/255 |
| 7,990,993 B1* | 8/2011 | Ghosh | .................. | H04L 45/025 370/428 |
| 8,339,959 B1* | 12/2012 | Moisand | ............. | H04L 63/0236 370/235 |
| 8,605,722 B1* | 12/2013 | Sindhu | .................... | H04L 45/16 370/390 |
| 9,491,087 B1* | 11/2016 | Zhang | .................. | H04L 45/745 |
| 2005/0038907 A1* | 2/2005 | Roeder | .................. | H04L 45/00 709/238 |
| 2010/0080225 A1* | 4/2010 | Nordmark | ............... | H04L 45/00 370/392 |
| 2013/0339481 A1* | 12/2013 | Hong | ..................... | H04L 67/16 709/217 |
| 2015/0092781 A1* | 4/2015 | Gerber | .................. | H04L 45/00 370/392 |

* cited by examiner

*Primary Examiner* — Yee F Lam

(74) *Attorney, Agent, or Firm* — Wayne Edward Ramage; Baker Donelson

(57) ABSTRACT

A Forwarding Information Base (FIB) caching system and scheme that selects and generates a minimal number of non-overlapping prefixes for the FIB cache to improve computer-based network communications and operations efficiency, accuracy and speed. Because the cached prefixes do not cover any longer prefixes in the full FIB, the present invention thus avoids cache-hiding issues. The system further comprises a FIB caching updating component that systematically handles cache misses, cache replacement, and routing updates.

13 Claims, 9 Drawing Sheets

| Label | Prefix | Next Hop |
|-------|--------|----------|
| A | 10/2 | 4 |
| B | 100.1/4 | 2 |
| C | 100.1.0.0/6 | 1 |

(a) FIB Entries

| Label | Prefix | Next Hop |
|-------|--------|----------|
| B | 100.1/4 | 2 |

(b) Cache Entries

FIG. 2

EFFICIENT FORWARDING INFORMATION BASE CACHING SYSTEM AND METHOD

This application is a continuation of U.S. application Ser. No. 14/524,890, filed Oct. 27, 2014, which claims benefit of and priority to U.S. Provisional Application No. 61/895,486, filed Oct. 25, 2013, by Yaoqing Liu, et al., and is entitled to those filing dates for priority. The specification, figures, appendices, and complete disclosures of U.S. Provisional Application No. 61/895,486 and U.S. application Ser. No. 14/524,890 are incorporated herein by specific reference for all purposes.

This invention was made with the support of the United States government under NSF Contract No. 0721645. The Government has certain rights in this invention.

FIELD OF INVENTION

This invention relates to a system and method for the efficient caching of routing forwarding table entries. More particularly, this invention relates to a system and method for efficiently caching routing forwarding table entries with minimal non-overlapping prefixes to improve computer-based network communications and operations efficiency, accuracy and speed.

BACKGROUND OF THE INVENTION

The size of the global Routing Information Base (RIB) has been increasing at an alarming rate. This leads directly to rapid growth in the Forwarding Information Base (FIB) size. The growth in FIB size is particularly concerning because the FIB memory in line cards is much more expensive than regular memory modules in route processors. FIB memory in line cards needs to operate at much higher speeds, and it can be very costly to increase this memory capacity frequently (to match RIB size increases) for all routers in an Internet Service Provider (ISP). In addition, as the size of FIB memory increases, the FIB lookup time also may increase and the line card may require more power to operate.

One approach to reducing the impact of large FIBs is FIB caching, i.e., caching the most popular FIB entries in a fast-memory cache, while storing the full FIB in lower-cost, slower memory. However, there are a number of problems with FIB caching, the feasibility of which generally depends on how much locality is in the network traffic. Network links forward a huge number of packets every second, so even a 1% miss ratio can lead to millions of lookups per second in slow memory. This is an especially serious problem when a router starts with an empty cache, or when the cache needs to be filled without prior traffic information. Further, Internet forwarding uses longest-prefix match rather than exact match, so FIB caching often results in a cache-hiding problem where the packet's longest-prefix match in the FIB cache differs from that in the full FIB, and the packet thus is forwarded to the wrong next hop. In addition, prefixes and routes change periodically, and these changes may be implemented more slowly in the FIB cache than in the full FIB, again resulting in a cache-hiding problem.

SUMMARY OF THE INVENTION

In various exemplary embodiments, the present invention comprises a Forwarding Information Base (FIB) caching system and scheme that selects and generates a minimal number of non-overlapping prefixes for the FIB cache to improve computer-based network communications and operations efficiency, accuracy and speed. Because the cached prefixes do not cover any longer prefixes in the full FIB, the present invention thus avoids cache-hiding issues. The system further comprises a FIB caching updating component that systematically handles cache misses, cache replacement, and routing updates. As a result, the present invention results in a hit ratio higher than 99.95% with only 20K prefixes (or 5.36% of the full FIB) in the cache. Further, the initial cache is filled with the shortest non-overlapping prefixes generated from the full FIB, which greatly increase the hit ratio for initial traffic. For example, a cache initialized in accordance with the present invention can achieve a hit ratio of approximately 85% for the first 100 packets, compared to 65% for a general uninitialized cache.

An example of a router architecture with the FIB caching system of the present invention comprises a control plane (in the route processor) containing the Routing Information Base (RIB), while the data plane (in the line card) comprises slow FIB memory and faster FIB cache memory. The slow FIB memory contains a copy of the full forwarding table (FIB) with all prefix entries and next hop information, while the FIB cache memory contains the FIB cache. The slow FIB memory is in the data plane with the faster FIB cache memory so that a cache miss or cache replacement event can be quickly handled.

The data traffic with incoming packets is received by the FIB cache, where it is checked for matching prefixes in the cache. If a matching prefix is found, the packet is directed to the next hop. If a cache miss event occurs (i.e., no matching prefix is found in the cache), then the information is retrieved from the slow FIB memory, and the FIB may be updated. Similarly if the cache is full, a cache replacement event occurs. The system will either delete or update a FIB cache entry according to different scenarios.

RIB updates may generate route announcement and route withdrawal events. These changes in routes are propagated initially to the slow FIB memory, and then, if necessary, as an update to the FIB cache.

In several embodiments, the system of the present invention operates through the generation and selection of leaf prefixes. This process allows the system to avoid the cache-hiding problem, and achieve other efficiencies as described herein. FIB caching is different from traditional caching mechanisms, because even if a packet has a matching prefix in the cache, it may not be the correct entry for forwarding the packet if there is a longer matching prefix in the full FIB.

In several embodiments, the present invention avoids the cache-hiding problem by caching the most specific non-overlapping prefixes that do not hide any longer prefixes in the full FIB. This system of FIB caching using minimal non-overlapping prefixes thus selects or generates only the shortest leaf prefixes needed by the data traffic to minimize the number of cached prefixes while avoiding cache-hiding.

In one embodiment, the present invention uses a space-optimized tree where the child prefix can be longer than the parent prefix by more than one, and thus stores routing tables in a compact manner. However, the present invention can be applied to any tree-based structures.

Several embodiments of the invention further comprise a variety of cache operations, including, but not limited to, cache initialization, cache-miss traffic handling, and cache replacement.

Cache initialization is the pre-filling of the cache during deployment so that initial traffic can be handled efficiently. In one embodiment, the present invention fills up the initial empty cache with a set of leaf prefixes from the full FIB that covers the most IP addresses. In one specific embodiment, breadth-first search is employed to find the shortest leaf prefixes (up to the cache size). This achieves a high hit ratio from the start while avoiding the cache-hiding problem. If a router is able to store the cache content in a non-volatile memory before its start or restart, it can also use that to fill up the initial cache.

For cache miss traffic handling, the system can store packets experiencing cache miss in a separate queue, and these packets can be forwarded once the prefixes from slow FIB memory are installed into the cache.

For cache replacement, in one embodiment, the system uses the Least Recently Used (LRU) replacement method when a new prefix needs to be installed into a full cache. The optimal cache replacement method may be used as an alternative.

BRIEF DESCRIPTION OF THE DRAWINGS

FIG. 2 shows an example of the cache hiding problem.

DETAILED DESCRIPTION OF EXEMPLARY EMBODIMENTS

In various exemplary embodiments, the present invention comprises a Forwarding Information Base (FIB) caching system and scheme that selects and generates a minimal number of non-overlapping prefixes for the FIB cache to improve computer-based network communications and operations efficiency, accuracy and speed. Because the cached prefixes do not cover any longer prefixes in the full FIB, the present invention thus avoids cache-hiding issues. The system further comprises a FIB caching updating component that systematically handles cache misses, cache replacement, and routing updates. As a result, the present invention results in a hit ratio higher than 99.95% with only 20K prefixes (or 5.36% of the full FIB) in the cache. Further, the initial cache is filled with the shortest non-overlapping prefixes generated from the full FIB, which greatly increase the hit ratio for initial traffic. For example, a cache initialized in accordance with the present invention can achieve a hit ratio of approximately 85% for the first 100 packets, compared to 65% for a general uninitialized cache.

Figure 1:
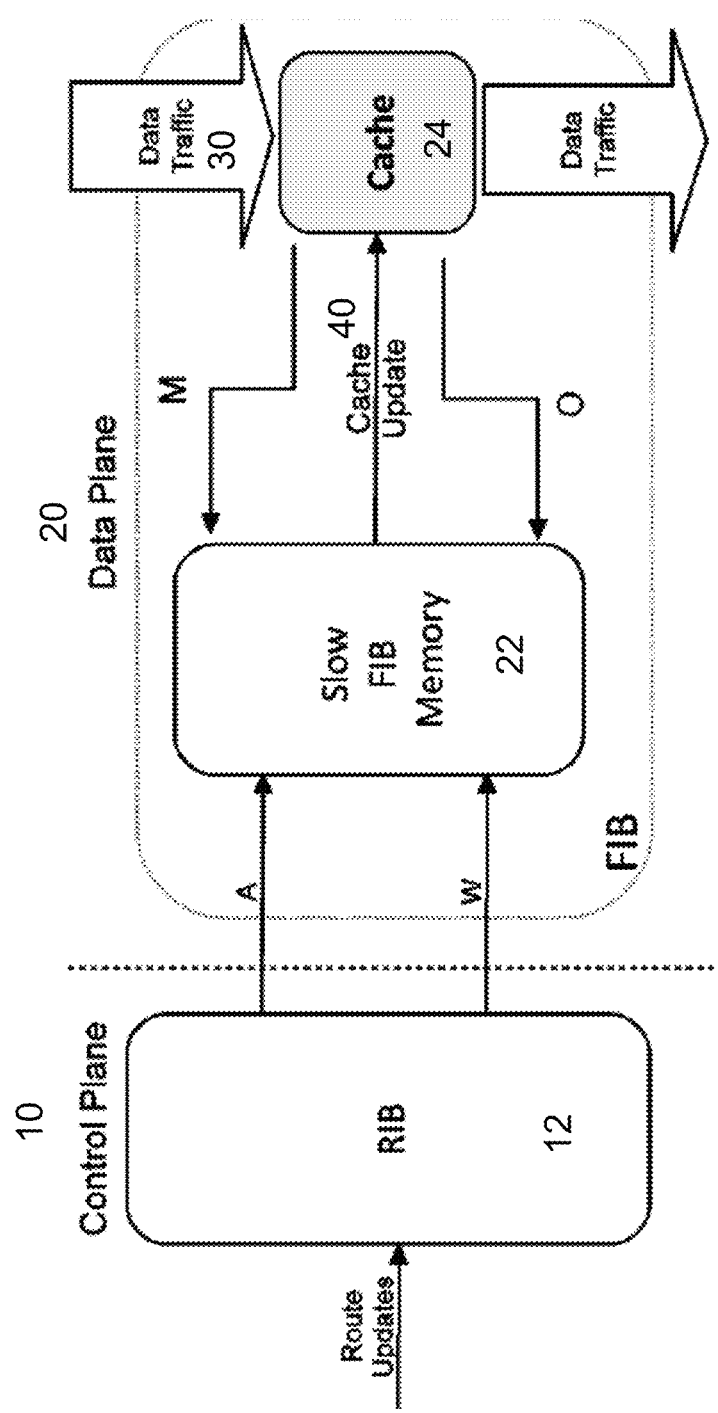
FIG. 1 shows a view of a system in accordance with an embodiment of the present invention.

An example of a router architecture with the FIB caching system of the present invention is shown in FIG. 1. A control plane 10 (in the route processor) contains the Routing Information Base (RIB) 12, while the data plane 20 (in the line card) comprises slow FIB memory 22 and faster FIB cache memory 24. The slow FIB memory 22 contains a copy of the full forwarding table (FIB) with all prefix entries and next hop information, while the FIB cache memory 24 contains the FIB cache. The slow FIB memory is in the data plane with the faster FIB cache memory so that a cache miss or cache replacement event can be quickly handled.

The data traffic 30 with incoming packets is received by the FIB cache 24, where it is checked for matching prefixes in the cache. If a matching prefix is found, the packet is directed to the next hop. If a cache miss event (M) occurs (i.e., no matching prefix is found in the cache), then the information is retrieved from the slow FIB memory, and the FIB may be updated (as described below) 40. Similarly if the cache is full, a cache replacement event (O) occurs. The system will either delete or update a FIB cache entry according to different scenarios.

RIB updates may generate route announcement (A) and route withdrawal events (B). These changes in routes are propagated initially to the slow FIB memory, and then, if necessary, as an update 40 to the FIB cache.

In several embodiments, the system of the present invention operates through the generation and selection of leaf prefixes. This process allows the system to avoid the cache-hiding problem described above, and achieve other efficiencies as described herein. FIB caching is different from traditional caching mechanisms, because even if a packet has a matching prefix in the cache, it may not be the correct entry for forwarding the packet if there is a longer matching prefix in the full FIB.

A simple example of this cache-hiding problem is shown in FIGS. 2(a) and (b). FIG. 2(a) shows an example of a FIB table with three prefixes (using 8-bit addresses and binary representation). The corresponding FIB cache is initially empty. Assume that a data packet destined to 10011000 arrives at a router. The router looks for the longest prefix match in the FIB cache, but finds none because the cache initially is empty. The router than looks up the full FB in slow FB memory (i.e., in the FB table), and retrieves the matching entry B with 1001/4, and the next hop 2. This matching entry B is loaded to the cache, which then has a single entry as shown in FIG. 2(b). Assume that a second data packet is received, but destined for 10010001. The router first checks the cache to see if there is a prefix matching the destination IP address, finds the matching prefix 1001/4 in the cache, and sends the packet to next hop 2. However, this is the wrong action, because the correct matching prefix for IP address 10010001 should be the more specific prefix C with 100100/6 and next hop 1, as seen in FIG. 2(a). In this example, the cached prefix 1001/4 hides the more specific prefix 100100/6 in the full FIB.

In several embodiments, the present invention avoids the cache-hiding problem by caching the most specific non-overlapping prefixes that do not hide any longer prefixes contained in the full FIB. In the above example, the address space of C (in FIG. 2(a)) is covered by B (in FIG. 2(b), so they are not non-overlapping prefixes (i.e., they overlap). The present invention accordingly does not simply load the prefix B into the FIB cache, as is common in prior art systems, because it will cause a problem for the later packets destined to an address for C.

Figure 3:
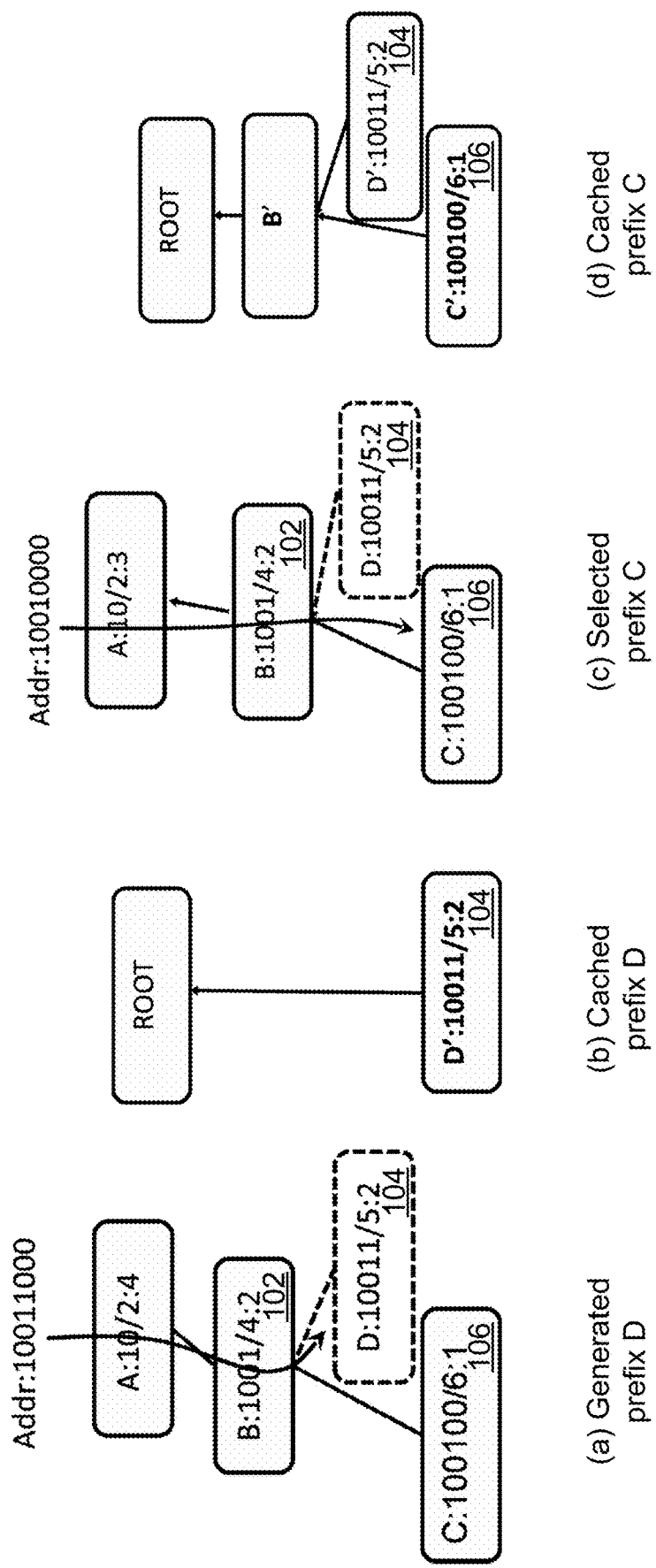
FIG. 3 shows an example of leaf prefix generation.

Instead, as seen in FIGS. 3(a)-(d), upon receiving the first data packet destined to address 10011000 as in the example above, the present invention generates a leaf prefix D 104 to represent the address space under B 102 that does not overlap with C 106, and puts D in the cache, as seen in FIG. 3(b). In this example, D has prefix 10011/5 with hop 2 (the same hop as its covering prefix, B). The leaf prefix may be dynamically generated. As seen in FIG. 3(c), the next packet, destined to 10010000, does not find a match in the cache, which contains leaf prefix D (unlike the above example shown in FIG. 2, where it would have found a match with B in the cache, resulting in incorrect forwarding). This causes a cache miss, and the system correctly finds the matching prefix C 106 with the next hop 1 in the full FIB. C 106 is then loaded into the cache along with D (i.e., upon a cache miss event, the system returns a leaf prefix that matches the data packet that caused the cache miss), as seen in FIG. 2(d). This system of FIB caching using minimal non-overlapping prefixes thus selects or generates only the shortest leaf prefixes needed by the data traffic to minimize the number of cached prefixes while avoiding cache-hiding.

In one embodiment, the present invention uses a space-optimized tree where the child prefix can be longer than the parent prefix by more than one, and thus stores routing tables in a compact manner. However, the present invention can be applied to any tree-based structures.

In one embodiment, the system uses the "Patricia Trie" space-optimized tree structure. Each node in the tree of the slow FIB is one of four types, which may change upon an update. These types help in keeping the FIB cache, slow FIB, and the RIB consistent with each other. The four types of nodes in the slow FIB are as follows:

(a) CACHE_ONLY (C)—a leaf node that is created on demand as a result of a cache miss event;

(b) FIB_ONLY (F)—a node derived from the original routing table or RIB update, but the prefix is not in the FIB cache;

(c) FIB_CACHE (H)—a leaf node derived from the routing table, where the prefix is in the cache; and (d) GLUE_NODE (G)—any other auxiliary node apart from the above three types of nodes.

Several embodiments of the invention further comprise a variety of cache operations, including, but not limited to, cache initialization, cache-miss traffic handling, and cache replacement.

Cache initialization is the pre-filling of the cache during deployment so that initial traffic can be handled efficiently. In several embodiments, the present invention fills up the initial empty cache with a set of leaf prefixes from the full FIB that covers the most IP addresses. Breadth-first search may be employed to find the shortest leaf prefixes (up to the cache size). This achieves a high hit ratio from the start while avoiding the cache-hiding problem. If a router is able to store the cache content in a non-volatile memory before its start or restart, it can also use that to fill up the initial cache.

For cache miss traffic handling, the system can store packets experiencing cache miss in a separate queue, and these packets can be forwarded once the prefixes from slow FIB memory are installed into the cache. For cache replacement, in one embodiment, the system uses the Least Recently Used (LRU) replacement method when a new prefix needs to be installed into a full cache. The optimal cache replacement method may be used as an alternative.

Figure 4:
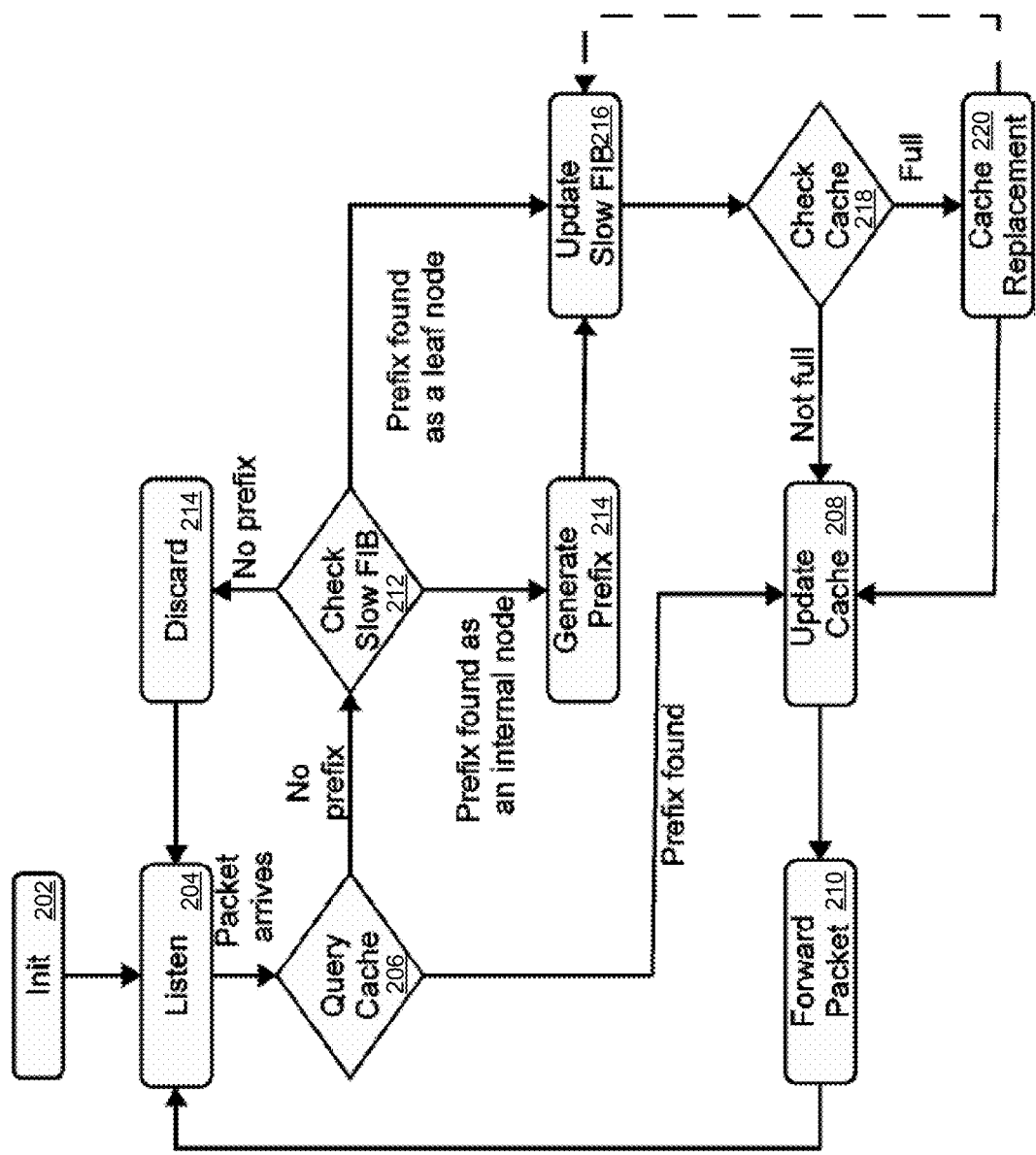
FIG. 4 shows an example of the workflow for handling incoming data traffic.

FIG. 4 shows an example of the workflow for how the system handles an incoming packet. In the initialization phase 202, the system loads all FIB entries into the FIB. Subsequently, the system fills up the entire cache with the leaf prefixes that have the shortest length, as follows. The system listens for an incoming packet 204, and upon arrival, the system performs a longest prefix match on the tree-based structure in the FIB cache 206. If the prefix is found, the packet is forwarded accordingly 210, and the prefix's status in the cached is updated to become the "latest accessed" 208 (which facilitates cache replacement, as discussed below).

If the prefix is not found in the cache (i.e., a cache miss condition), the system performs a lookup in the slow FB 212. If the lookup returns no matching prefix, the packet is discarded 214. If the longest matching prefix in slow FB is already a leaf node in the tree-based structure, then the leaf node prefix will be pushed to the FB cache as discussed below. If the longest matching prefix in slow FB is an internal node, a more specific (leaf) prefix is generated 214 and will be pushed to the FB cache as discussed below. The packet is forwarded 210 to the corresponding next hop in either case.

Generally speaking, the system updates the slow FIB 216, checks the cache to see if it is full 218, enters the leaf prefix in the cache if it not, or determines appropriate cache replacement 220 if it is. The dashed line in FIG. 4 indicates that the slow FIB also is updated during the cache replacement procedure. The process of handling cache misses and cache replacements is discussed in more detail below.

In the context of the four-node space space-optimized tree structure described above, performing a longest prefix matching in the slow FIB (in the event of a cache miss) results in three cases: (1) there is no matching node, and the packet is dropped; (2) there is a matching leaf node with type FIB_ONLY, in which case the leaf node is set to type FIB_CACHE and the leaf prefix with the corresponding next hop is stored in the FIB cache; or (3) there is a matching internal node with the type FIB_ONLY, in which case the system generates a CACHE_ONLY node, and installs it in the FB cache.

An example of generation of a CACHE_ONLY node is as follows. Suppose $P_L$ and $P_R$ are the respective left and right child nodes of node P, and X is the destination IP address. The system generates a CACHE_ONLY node with the same next hop as its parent on the tree structure, and with a prefix containing the first l+1 bits of X, where the value of l depends on $P_L$ and $P_R$. If $P_L$ is NULL, then the system compares $P_R$ with X to get the common portion Y with length I. If $P_R$ is NULL, then the system compares $P_L$ with X to get the common portion Y with length I. If $P_L$ and $P_R$ are both not NULL, then the system compares X with $P_L$ and $P_R$ separately to get the common portion $Y_L$ and $Y_R$. then finds the longer prefix Y with length l from $Y_L$ and $Y_R$.

FIGS. 5(a)-(e) show an example of the case where $P_L$ and $P_R$ are both not NULL. In the figure, each node has the form NodeName:Prefix:NextHop and Node Type for the tree structure. Node Name is A, B, C, and the like. Node Type is F, H, C and G (as described above). A bold font indicates a field updated in the current step. A solid outline indicates a node with a prefix from the original routing table or an update. A dashed outline indicates a generated node due to a cached miss update. A shaded grey node (for the slow FIB) indicates a node that is also in the FIB cache.

Figure 5:
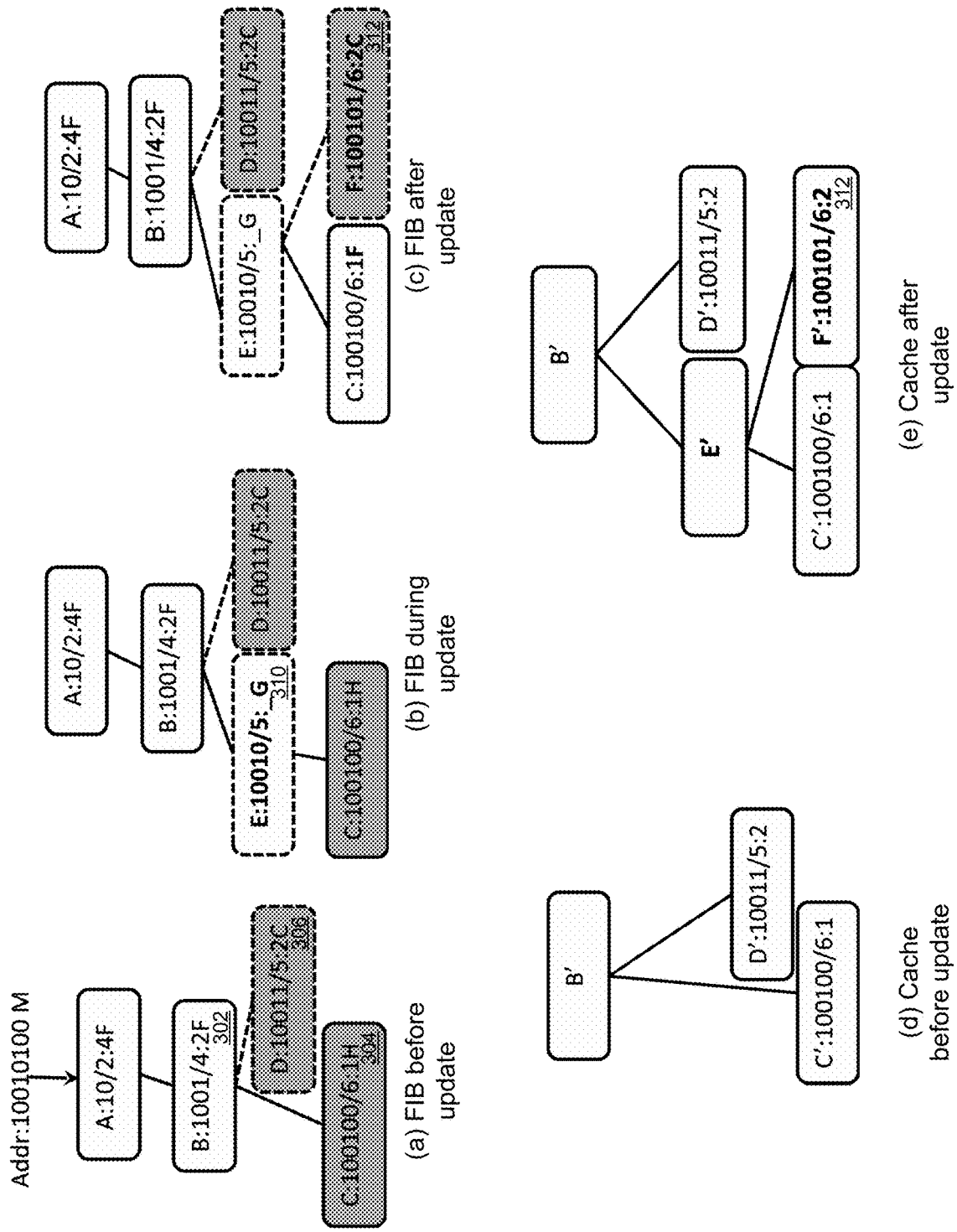
FIG. 5 shows an example of a cache miss update operation.
Figure 6:
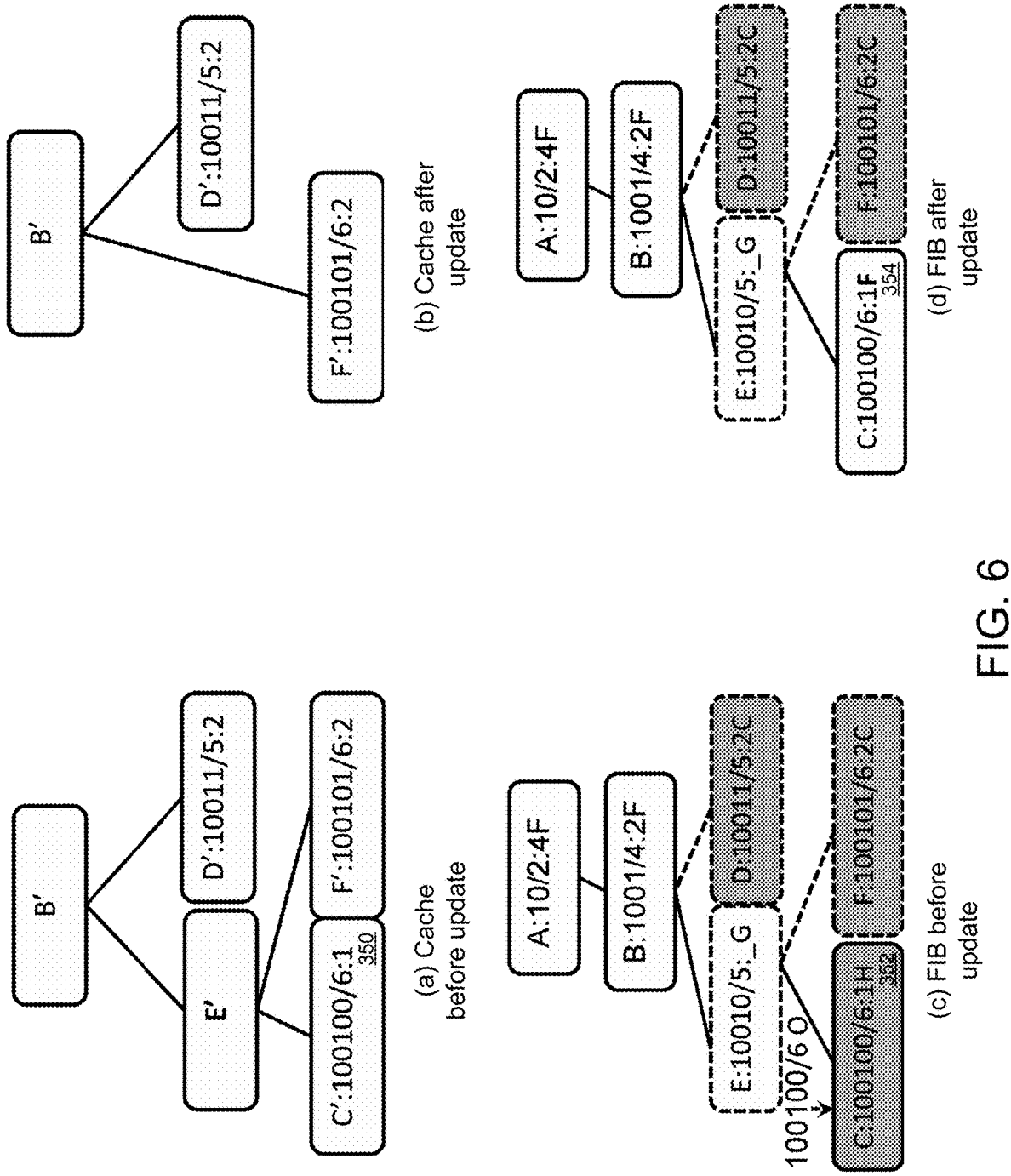
FIG. 6 shows an example of a cache replacement update operation.

In the slow FIB, with data packet destined to address X (i.e., 10010100) 300, matching node B 302 (with prefix 1001/4) has a left child ($P_L$) C 304 and a right child ($P_R$) D 306. The common portion $Y_L$=(X & C)=(10010100 & 100100/6)=10010/5. The common portion $Y_R$=(X & D)= (10010100 & 10011/5)=1001/4. The system picks the longer one (10010/5), so Y=$Y_L$=10010/5 and l=5. The system sets this as the as the prefix of the imaginary parent or glue node E 310, as seen in FIG. 5(b). The system then generates the new leaf node F 312 using the first l+1 digits of X, as X/(l+1), or, in this case, 100101/6, as seen in FIG. 5(c). The node type of F is CACHE_ONLY (C), as it is generated on demand and will be installed into the cache. Note that C is changed to node type FIB_ONLY (F). FIG. 5(d) shows the cache before the update, while FIG. 5(e) shows the cache after the update with F (this assumes that the cache is not full, and nothing in the cache needs to be replaced).

When the cache becomes full, some prefixes in the FIB cache need to be removed according to the Least Recently Used (LRU) replacement method (or other method, as described above). The prefix is removed from the cache, and the slow FIB is then updated depending on the corresponding node type in slow FIB. If the corresponding node type is CACHE_ONLY, this means that the node was created on demand, and there is no such entry in the RIB, so the node is removed directly (from slow FIB). If the corresponding node type is FIB_CACHE, this means the node was originally from the RIB or RIB update, and cannot be removed completely from slow FIB. The node remains in slow FIB, but the type is changed to FIB_ONLY.

FIGS. 6(a)-(d) shows an example of cache replacement updating. The prefix 100100/6:1 350 is in the cache in FIG. 6(a), and is removed in FIG. 6(b). The corresponding slow FIB operation. The corresponding node type is "H" (FIB_CACHE) 352 in slow FIB before the update, and this is changed to "F" (FIB_ONLY) 354 after the update (see FIGS. 6(c)-(d)).

Figure 7:
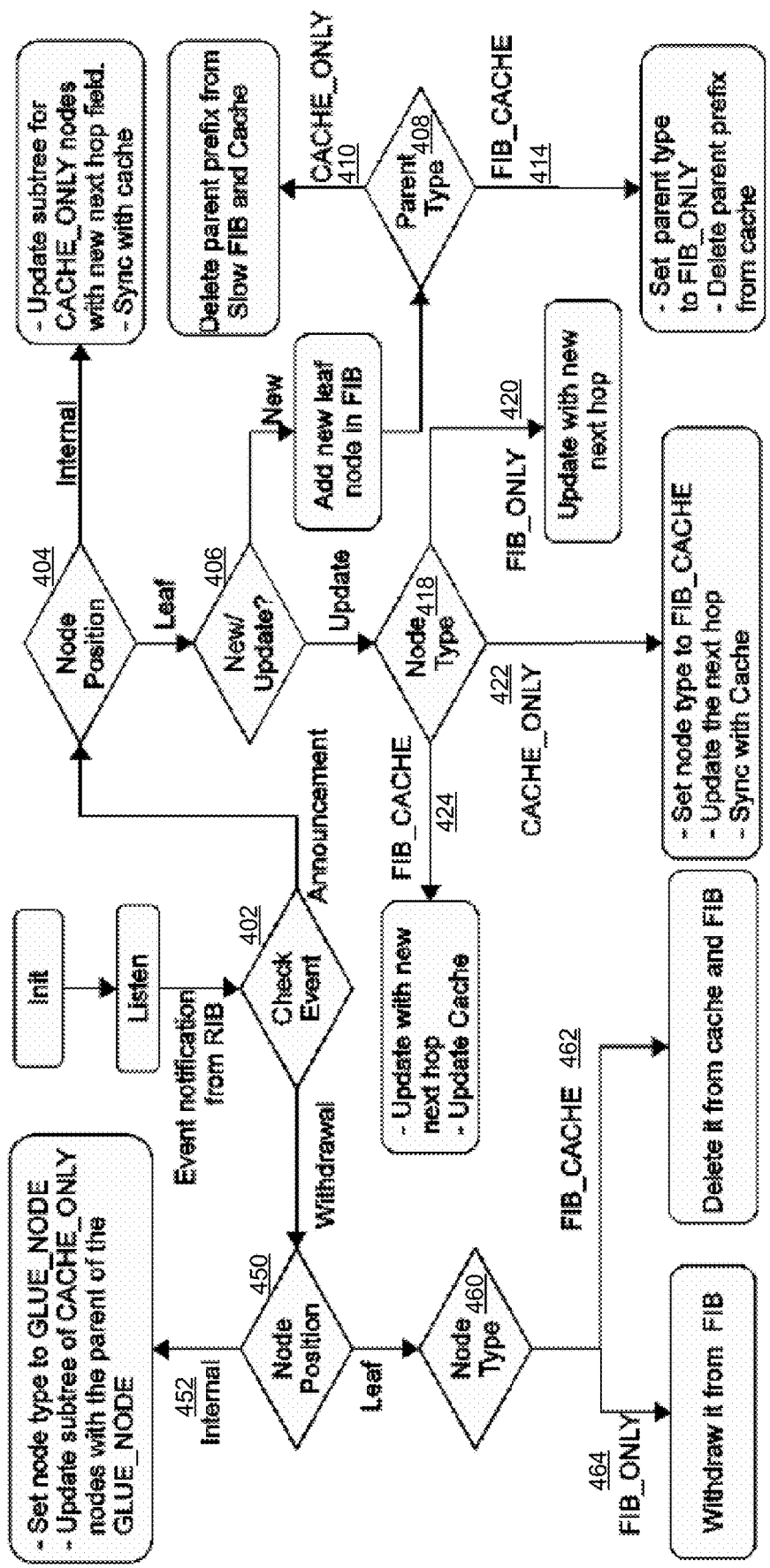
FIG. 7 shows an example of the workflow for handling announcement and withdrawal operations.

Periodically, slow FIB may be updated with a new prefix or a change to an existing entry, or removal of an existing entry. A route announcement is used to add a new prefix or update an existing entry, while a route withdrawal is used to remove an existing entry. FIG. 7 shows an example of the workflow for how the system handles route announcements and withdrawals. Note that the diagram does not show loopbacks to the "Listen" state, but should be presumed to be part of normal operations flow.

Upon receiving an event notification from the RIB, the system determines whether it is an announcement or a withdrawal event 402. If an announcement, then the system determines the position of the affected node as an internal node or a leaf node 404. If internal, the system determines whether a new node is being added, or an existing node is being updated. If a new node is being added as an internal node, all the CACHE_ONLY nodes whose next hops are derived from this node should have the same next hop as this node, so the system updates those nodes with the new next hop, and then updates the FIB cache accordingly to synchronize the next hop information. The FIB_CACHE nodes are not updated in slow FIB because their next hops are derived directly from the corresponding real prefixes in the RIB, and are not derived from their ancestors in the tree. If an existing internal node is being modified, the system updates all the CACHE_ONLY nodes whose next hops are derived from the updated node with the new next hop, and the FIB cache is updated accordingly with the new next hop information.

If the affected node is a leaf node, the system determines 406 whether a new node is being added, or an existing node is being updated. If a new leaf node is being added to the slow FIB, the system looks at the node type of the direct parent 408. If the direct parent node type is CACHE_ONLY 410 (indicating that the prefix in the parent node was generated on demand and is in the cache), then the system removes the parent node from both slow FIB and the cache in order to avoid the cache-hiding problem, as described above. If the direct parent of the new node is FIB_ONLY, then the parent node is not in the cache, and nothing need be done to the cache. If the direct parent of the new node is FIB_CACHE 414 (indicating that the prefix in the parent node is in the cache), then the system is sets the parent node type to FIB_ONLY and removes the prefix from the cache.

If an existing leaf node is being updated, the system looks at the node type 418. If the node type is FIB_ONLY 420 (indicating the prefix in the node is not in the cache), the node is simply updated with the new next hop. Otherwise, the system updates the node with the new next hop, changes the node type to FIB_CACHE (if the node type was CACHE_ONLY), and updates the next hop in the corresponding cache entry accordingly 422, 424.

In the event of a route withdrawal, the system first checks to see if it matches an existing node in the FIB, as the corresponding prefix is supposed to be in the FIB in order to be withdrawn. If there is no match, the route withdrawal needs no further processing. If there is an match, then the system determines the position of the affected node as an internal node or a leaf node 450. If internal 452, the system deletes the next hop, and sets the node type to GLUE_NODE, as the node is still useful in the FIB tree structure to connect other nodes. Since only leaf nodes are in the cache, this internal node cannot be in the cache, and thus no cache update is needed. The system then updates the next hop field of those CACHE_ONLY nodes whose next hop was derived from this node being withdrawn, and the cache is updated accordingly.

If a leaf node, the system determines the type of node 460. If the node type is FIB_CACHE 462, the system deletes the node from both slow FIB and the FIB cache. If the node type is FIB_ONLY 464, the system deletes the node from slow FIB (since it is not in the cache).

FIGS. 8(a)-(d) show an example of a route announcement comprising a update 502 with next hop "3" for an existing node E (10010/5) 504. E is in an internal node. As the update is for an internal node, the node type is changed to FIB_ONLY 506, and the system updates those CACHE_ONLY nodes whose next hop was derived from the updated node in order to keep the forwarding behavior correct. Thus, in the figure, node F with the prefix 100101/6 is a CACHE_ONLY node that inherited its next hop from E, so its next hop is changed to "3" 508 in FIG. 8(b). The corresponding entry in the cache is updated from next hop "2" to next hop "3" in FIGS. 8(c) and (d). Any subsequent data packet destined to 100101/6 will be forward correctly to new next hop 3.

Figure 8:
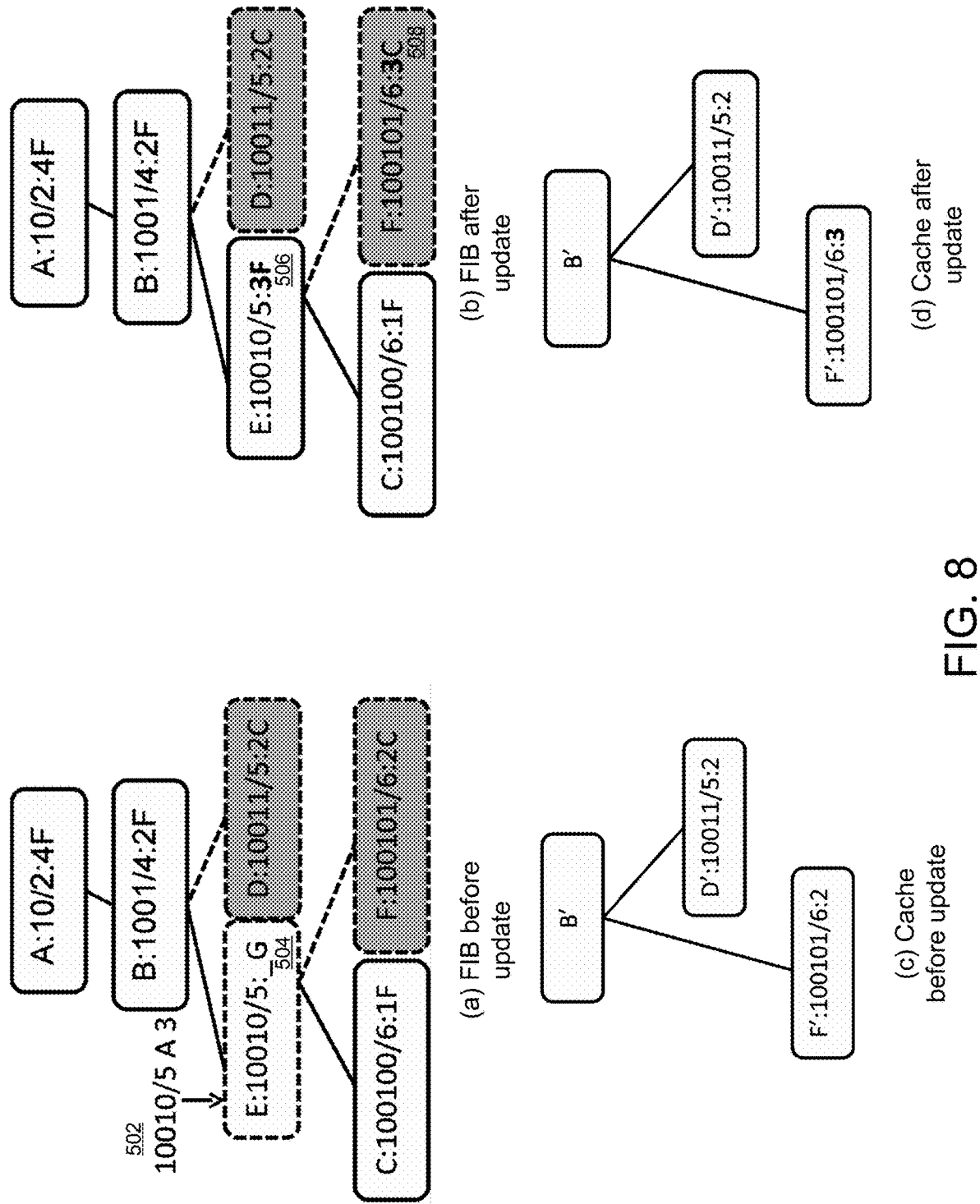
FIG. 8 shows an example of an announcement update operation.
Figure 9:
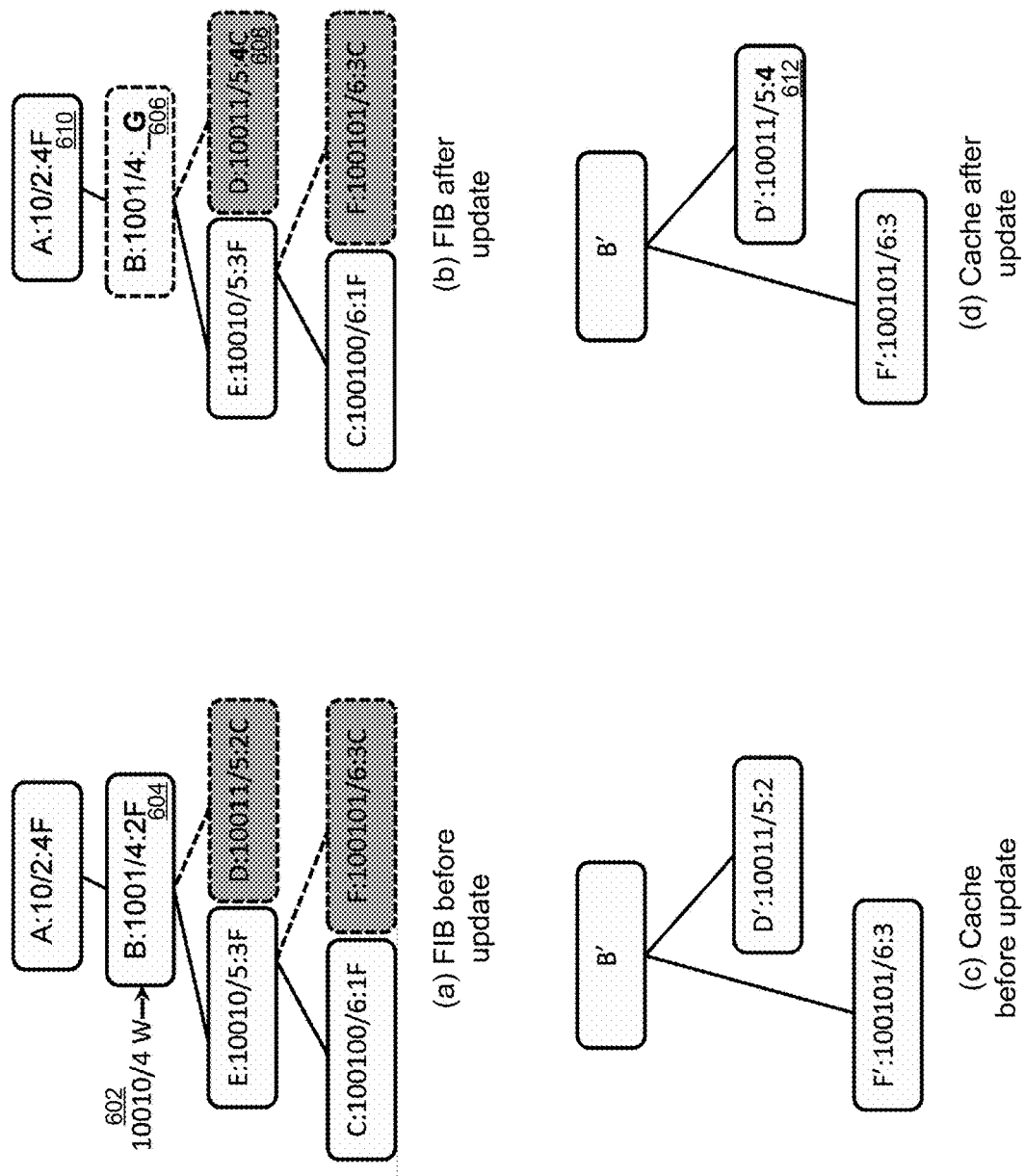
FIG. 9 shows an example of a withdrawal update operation.

FIGS. 9(a)-(d) show an example of a route withdrawal 602 comprising removing the prefix 1001/4, which corresponds to node B 604 (an internal node case). The type of node B is set to GLUE_NODE 606. Then, the system updates the affected CACHE_ONLY nodes. In this case, node D (10011/5) is the only affected CACHE_ONLY node, and is updated 608 with the next hop "4" of its nearest ancestor, node A 610, as seen in FIG. 9(b). The cache entry with prefix 10011/5 is updated with the new next hop "4" 612, as seen in FIGS. 8(c)-(d).

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A device for network communications, comprising:
    a Forwarding Information Base (FIB) memory containing
        a full Forwarding Information Base data table in a
        tree-based structure with nodes, said full Forwarding
        Information Base data table with nodes comprising full prefix entries and corresponding full prefix next hop information for data packets; and a Forwarding Information Base cache memory containing or configured to contain a plurality of leaf prefix entries and corresponding leaf prefix next hop information, wherein said plurality of leaf prefix entries and leaf prefix next hop information are selected or generated from the full prefix entries and corresponding full prefix next hop information contained in the full Forwarding Information Base data table, and further wherein said plurality of leaf prefix entries are the most specific non-overlapping prefixes that do not hide or cover any longer full prefix entries contained in the full Forwarding Information Base data table;

wherein the full prefix entries in the full Forwarding Information Base data table and the plurality of leaf prefix entries in the Forwarding Information Base cache memory are organized in a tree structure with internal nodes and leaf nodes;

further wherein the nodes in the full Forwarding Information Base data table comprise at least three types of nodes: (i) FIB-Only nodes where the full prefix entry is in the full Forwarding Information Base data table but not in the Forwarding Information Base cache memory; (ii) FIB-Cache leaf nodes where the full prefix entry is in the full Forwarding Information Base data table and also is in the Forwarding Information Base cache memory; and (iii) Cache-Only leaf nodes where a specific non-overlapping leaf prefix entry has been generated on demand.

2. The device of claim 1, wherein the Forwarding Information Base cache memory is initially filled with the shortest leaf prefixes generated from the full Forwarding Information Base data table.

3. The device of claim 1, wherein the device, upon receiving a data packet with destination information, first checks in the Forwarding Information Base cache memory for leaf prefix entries that match the destination information.

4. The device of claim 3, wherein, if there is no match found in the Forwarding Information Base cache memory, the device checks in the full Forwarding Information Base data table for an entry that matches the destination information.

5. The device of claim 4, wherein the device generates a leaf prefix entry and next hop information based upon the match found in the full Forwarding Information Base data table, and adds it to the Forwarding Information Base cache memory.

6. The device of claim 5, wherein at least one leaf prefix entry and next hop information are removed from the Forwarding Information Base cache memory to be replaced by the leaf prefix entry and next hop information being added.

7. The device of claim 6, wherein the at least one removed entry is the least recently used entry.

8. The device of claim 1, wherein the Forwarding Information Base cache memory is faster than the Forwarding Information Base memory.

9. A method of managing a Forwarding Information Base (FIB) cache to improve network communications; comprising the steps of:

receiving a data packet with destination information;

determining, using a microprocessor, if there is match between the destination information and one or more leaf prefix entries in the Forwarding Information Base (FIB) cache;

if there is a match, selecting the longest matching leaf prefix entry from the Forwarding Information Base cache, and forwarding the data packet to the next hop based on the next hop information attached to the selected leaf prefix entry;

if there is not a match in the Forwarding Information Base cache, determining if there is a match between the destination information and one or more prefix entries in a full Forwarding Information Base data table;

if there is a match in the full Forwarding Information Base data table, then performing the steps of:

selecting the longest matching prefix entry for the full Forwarding Information Base data table, and forwarding the data packet to the next hop based on the next hop information attached to the selected prefix entry;

generating a leaf prefix entry with corresponding next hop information from the selected prefix entry and corresponding next hop information in the full Forwarding Information Base data table; and adding the generated leaf prefix entry and corresponding next hop information to the Forwarding Information Base cache;

wherein the one or more leaf prefix entries in the Forwarding Information Base cache are the most specific non-lapping prefixes that do not hide or cover any longer prefix entries contained in the full Forwarding Information Base data table;

wherein the full prefix entries in the full Forwarding Information Base data table and the one or more leaf prefix entries in the Forwarding Information Base cache are organized in a space-optimized tree structure with internal nodes and leaf nodes;

further wherein the leaf nodes in the full Forwarding Information Base data table comprise at least three types of nodes: (i) FIB-Only nodes where the full prefix entry is in the full Forwarding Information Base data table but not in the Forwarding Information Base cache memory; (ii) FIB-Cache leaf nodes where the full prefix entry is in the Forwarding Information Base data table and also is in the Forwarding Information Base cache; and (iii) Cache-Only leaf nodes where a specific non-overlapping leaf prefix entry has been generated on demand.

10. The method of claim 9, further comprising the step of initially filling an empty Forwarding Information Base Cache with the shortest leaf prefixes generated from the full Forwarding Information Base data table.

11. The method of claim 10, further comprising the step of removing at least one leaf prefix entry and next hop information from the Forwarding Information Base cache to be replaced by the leaf prefix entry and next hop information being added.

12. The method of claim 11, wherein the at least one removed entry is the least recently used entry.

13. The method of claim 9, further comprising the steps of:

receiving a route update or withdrawal announcement;

updating, adding or removing a prefix entry and corresponding next hop information data in the full Forwarding Information Base data table to comply with the route update or withdrawal announcement; and synchronizing changes in the full Forwarding Information Base data table with leaf prefix entries and corresponding next hop information data in the Forwarding Information Base cache.

* * * * *